United States Patent Office 2,956,583
Patented Oct. 18, 1960

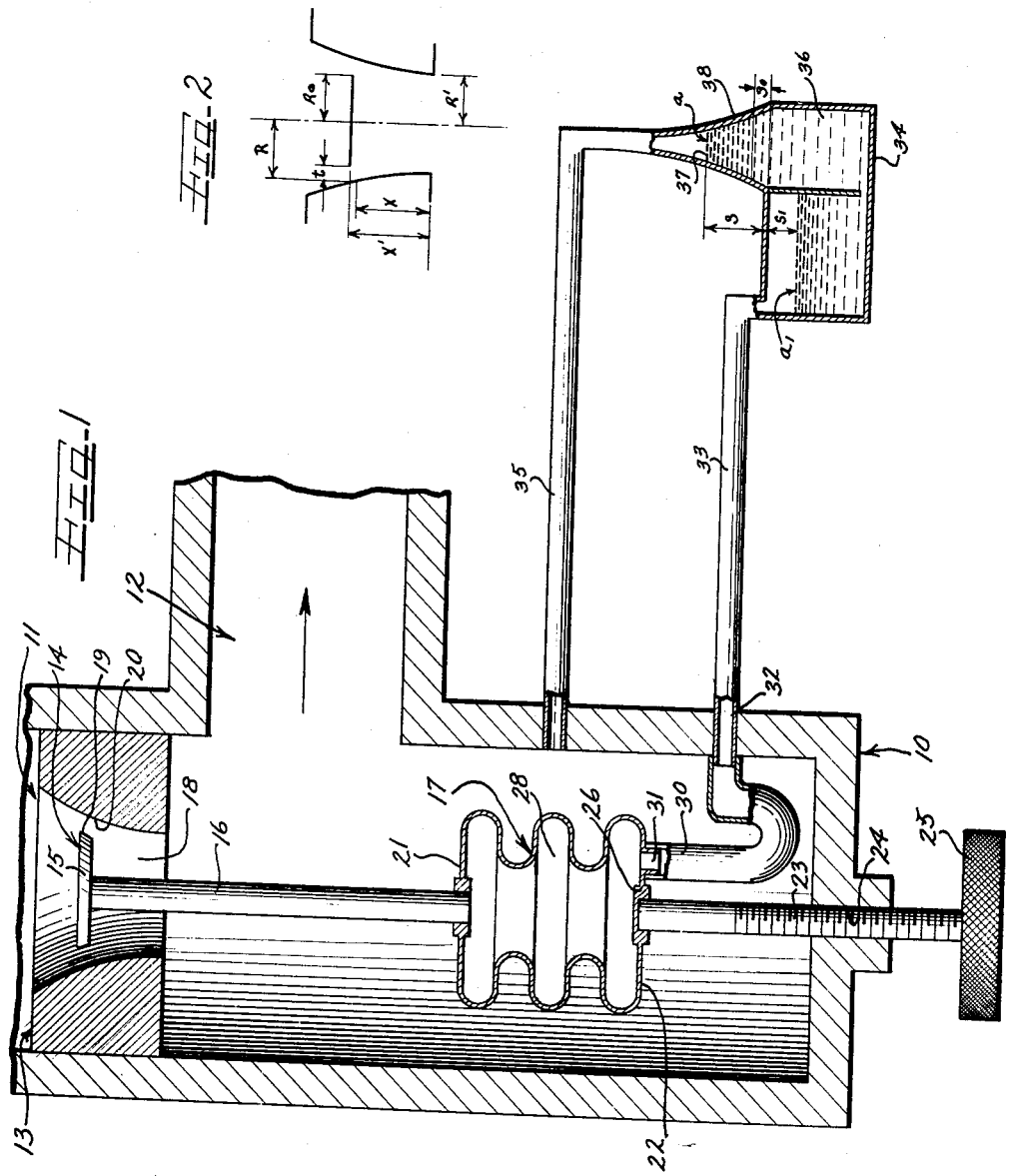

2,956,583

FLUID CONTROL WITH LIQUID BACKING

Victor L. Streeter, Ann Arbor, Mich., assignor to The Dole Valve Company, Chicago, Ill., a corporation of Illinois Filed Oct. 15, 1956, Ser. No. 615,784

10 Claims. (Cl. 137—517)

The present invention relates to an improved flow control device and to a device for maintaining the flow of fluids at a constant rate regardless of fluctuation of fluid pressure.

There has been a need for fluid flow control devices capable of rapid response which function to accurately regulate the flow of fluid such as water and are capable to obtain a constant flow rate independent of variations of fluid pressures or head at the inlet and capable of discharging the fluid at a constant pressure discharge. A device of this type is disclosed in my co-pending patent application "Adjustable Flow Control," Serial No. 446,-867, filed June 30, 1954. The present invention utilizes certain features of the mechanism therein disclosed and employs an improved method and apparatus for obtaining a non-linear resistance to the displacement of the valve with variations in head of the fluid control by the use of a liquid.

An object of the invention is to provide a new and improved flow control apparatus utilizing a flow orifice and a poppet valve member or metering pin, one of which is movable with respect to the other and biased toward open position by an apparatus having non-linear characteristics cooperating with the relative revolution profiles of the flow orifice and movable valve member.

Another object of the invention is to provide a valve member having a flow orifice and a movable valve member therein with relative profiles to vary the discharge with relative movements wherein one of the members is controlled relative to the pressure drop across the movable valve member to obtain a constant liquid flow rate with variations in fluid pressure drop through the valve.

Still another object of the invention is to provide a flow control valve member of the type described wherein the position of the valve is automatically controlled by a liquid backing member that provides a simplified improved arrangement capable of improved actuation of the valve and capable of simplified reliable design.

Another object of the invention is to provide an improved flow control having an orifice and relatively movable metering valve member wherein the position of the movable member is controlled so as to provide a device with constant flow characteristics over a predetermined pressure fluctuation range.

Another object of the invention is to provide a flow control valve having a stationary and a movable member including a valve poppet and an orifice surrounding the poppet with one of the members following the relationship of $$C_d A = (C_d A)_{\min} e^{\frac{x' \ln H}{2Y_o}}$$

wherein the position of the movable valve member is controlled by a fluid resistance having non-linear control characteristics.

Still another object of the present invention is to provide a new and improved flow control valve with a movable poppet surrounded by an orifice wherein a flow path is defined between the valve members and the members are shaped to follow the relation of $$x = \frac{2Y_o}{\ln H}\left\{\ln\left[2\sqrt{2}\frac{r_o+\frac{t}{2}}{r'^2-r_o^2}\frac{Y_o}{\ln H}\sqrt{1-\sqrt{1-\left(\frac{t \ln H}{Y_o}\right)^2}}\right] - \frac{1}{2}\left[-1\sqrt{1-\left(\frac{t \ln H}{Y_o}\right)^2}\right]\right\}$$

wherein the movable valve member is controlled by a fluid backing member having non-linear resistance properties.

Another object of the invention is to provide a non-linear resistance for controlling the position of the movable valve member relative to a mating valve member where one of the members is a valve poppet and the other is a metering valve orifice having relative contours capable of yielding a straight line flow relationship wherein the resistance follows the relation of $$F = C_D \pi r_o^2 \gamma h$$

Another object of the invention is to provide a new and improved metering valve poppet and orifice movable relative to each other wherein the position of the movable member is controlled by bellows supplied with the fluid flowing and in contact with liquid in a manometer having a leg of varying cross section following the relationships $$a = \frac{a_1}{\frac{a_1 \ln H}{A_b Y_o} s_o e^{\frac{s_1 a_1 \ln H}{A_b Y_o}} - 1}$$

and $$s = s_o e^{\frac{s_1 a_1 \ln H}{A_b Y_o}} - s_1$$

Another object of the invention is to provide an improved adjustable valve flow control device where the moving member is positioned by non-linear resistance including a bellows supplied with fluid from a manometer tube having a varying cross section.

Other objects, features and advantages of the present invention will become more apparent to those skilled in the art and those receiving complete disclosure of the invention from the following detailed description presented by the specification, claims and the appended drawing in which:

Figure 1 is a somewhat diagrammatic elevational view of the apparatus employing the principles of the invention and illustrating the preferred embodiment thereof; and, Figure 2 shows the symbols used with respect to the orifice.

As illustrated in the figures of the drawing, the flow control device shown therein embodies a valve having relatively movable members including an orifice and a poppet or stem controlling member located within the orifice with one of said members having a profile so that the throat defined between them will be capable of delivering a constant discharge with pressure variations. The movable member is positioned relative to the stationary member with pressure variations so that the throat area varies inversely as the square root of the head.

To achieve this relationship the valve members are profiled in accordance with the law set forth in the above referred to patent application "Adjustable Flow Control," Serial No. 446,867 wherein the throat profile design is in accordance with the law $$C_d A = (C_d A)_{min}\, e^{\frac{x'\ln H}{2Y_o}} \qquad (1)$$

The equation for the throat profile is represented by $$x = \frac{2Y_o}{\ln H}\left\{\ln\left[2\sqrt{2}\,\frac{r_o + \frac{t}{2}}{r'^2 - r_o^2}\,\frac{Y_o}{\ln H}\sqrt{1 - \sqrt{1 - \left(\frac{t \ln H}{Y_o}\right)^2}}\right] - \frac{1}{2}\left[1 - \sqrt{1 - \left(\frac{t \ln H}{Y_o}\right)^2}\right]\right\}$$

The movable valve member is controlled in its position by a non-linear control as will presently be described.

In the embodiment shown in the drawing, there is provided a valve housing 10 having a fluid inlet 11 and a fluid outlet 12. Within the valve housing 10, between the fluid inlet 11 and the fluid outlet 12, there is provided orifice defining means 13 having an orifice 18 within which there is cooperatively arranged a poppet valve member or metering pin valve closure means 14.

The poppet 14, of the embodiment illustrated, includes a poppet plate 15 which is supported at the end of a poppet stem 16 that is mounted for actuation of the poppet on a plate at the top of the bellows 17. The poppet plate 15 is reciprocably disposed within the orifice or throat 18 defined by the member 13 and adjustably controls fluid flow through the area between the peripheral knife edge 19 of the plate 15 and the throat profile face 20 of the member 13.

The poppet valve stem is secured to the free end 21 of the bellows 17 and the lower end 22 of the bellows is mounted on an adjustable thumb screw 23 threaded into the threaded adjustment opening 24 of the valve housing 10. The end 25 of the thumb screw is knurled for ease of adjustment.

The thumb screw is connected to the bellows by a rotatable connection 26 in order that the thumb screw may be turned to move the bellows up and down thereby adjusting the position of the poppet plate 15 within the orifice 18.

Thus, it may be seen that by proper manipulation of the adjusting knob 25 the poppet plate 15 will be resiliently positioned axially in the orifice 18 to adjust the flow of fluid through the annular area between the knife edge 19 of the orifice plate 15 and the contoured face 20 of the orifice member. The face is so contoured that it has a profile or envelope which follows the laws developed and disclosed hereinbelow wherein the flow rate will be held substantially constant at any desired adjusted value therefor by resilient axial movement of poppet 14. The poppet will have the axial movement for a given range in accordance with the adjustment of the adjustment screw 24 and with variation of the screw 23 the different ranges of operation of the valve can be selectively chosen. For some purposes, the poppet 14 may be provided with narrow guides to center it in the orifice 18 but is shown as unsupported in a lateral direction.

The non-linear positional support for the poppet is provided by fluid means operative through the bellows 17. Whereas the bellows is shown with its free end 21 connected to the stem 16 of the poppet, it will be readily understood by those skilled in the art that within the teachings of the invention the poppet could be anchored to the wall of the valve housing 10 and the orifice defining member 13 connected to the bellows so as to be movable relative to the poppet thereby obtaining a variation in the cross sectional area of the orifice 18 during operation with change of pressure head across the valve plate 15. Also the poppet plate 15 could be contoured with the orifice terminating in a knife edge.

The bellows 17, by design, should have very small resistance to compression or expansion. The interior 28 of the bellows is filled with the liquid flowing through the control which flows into and out of the bellows through a connecting flexible tube 30 which connects to the bellows at the opening 31. The tube leads through the wall of the housing by a suitable fitting 32 and a conduit or line 33 leads to the manometer tube 34 which contains the manometer liquid.

The upper end of the manometer 34 opens to a tube or conduit 35 leading back through the wall of the housing 10 and opening into the interior of the housing so as to be in communication with the down stream pressure of the control valve. This pressure is substantially equal to the discharge pressure in the fluid outlet 12.

The fluid within the interior 36 of the manometer is not the same as in the interior 28 of the bellows 17. The level 37 of the fluid with the manometer tube fluctuates in accordance with the position of the plate 15 of the poppet which in turn varies in accordance with the pressure drop of the controlled fluid. The curved wall 38 of the manometer tube has a special conformation in accordance with the relationships that will now be developed and presented.

The throat profile or the surface of revolution 20 of the orifice 18 is designed in accordance with Formulae 1 and 2 as given above.

The general formula for the non-linear support of the poppet may be presented as $$y = \frac{Y_o}{\ln H}\ln \frac{F_o H}{F} \qquad (3)$$

Where $y$ is the position of support for the valve, in this case the bellows as indicated in the drawing.

The non-linear resistance to the displacement of the poppet disk 15 as required by Equation 3 may be expressed in terms of force exerted on the disk. This force, $F$, is $$F = C_D \pi r_o^2 \gamma h \qquad (4)$$

where $C_D$ is the dimensionless drag coefficient and $\gamma$ is the unit weight of fluid. The minimum design forces $F_o$ is then $$F_o = C_D \pi r_o^2 \gamma h_o \qquad (5)$$

$C_D$ is assumed to be constant over the range of travel of the disk. Substituting for $h$ and $h_o$ in Equation 3

$$y = \frac{Y_o}{\ln H}\ln \frac{F_o H}{F} \qquad (6)$$

The resistance as provided by the bellows is shown at 17 in the drawing with an area $A_b$ which forces manometer liquid into the manometer tube which has a varying cross section. The area of the manometer is determined as a function of $s$. The necessary equations are Equation 6, $$-A_b dy = a_1 ds_1 = a\, ds \qquad (7)$$

and $$\gamma F = A_b(\gamma_o - \gamma)(s + s_1) \qquad (8)$$

where $a_1$ is the constant cross sectional area and $\gamma_o$ is the unit weight of manometer fluid. Eliminating F and y from the last three equations to yield $a$ and $s$ in terms of $s_1$.

$$a = \frac{a_1}{\frac{a_1 \ln H}{A_b Y_o} s_o e^{\frac{s_1 a_1 \ln H}{A_b Y_o}} - 1}$$

and $$s = s_o e^{\frac{s_1 a_1 \ln H}{A_b Y_o}} - s_1$$

where $s_o$ is the value of $s$ for $s_1=0$ and $F=F_o$.

The discharge setting is altered by changing $z$.

For vertical installations the weight of moving parts could be compensated for by changing the amount of manometer liquid but would not otherwise disturb proper functioning of the controller. It will be recognized that installations in other positions may be readily adopted.

In the foregoing description the following is a summary of the symbols used:

| | |
|---|---|
| A | =area of opening between disc and throat |
| $a, a_1$ | =manometer cross-sectional areas |
| $A_b$ | =area of bellows |
| $C_d$ | =discharge coefficient |
| $C_D$ | =drag coefficient |
| $e$ | =base of natural logarithms |
| F | =pressure force on disc |
| $F_o$ | =minimum design force on disc |
| H | =ratio of maximum fluid head to minimum fluid head |
| $h_o$ | =minimum design head loss across disc |
| ln | =natural logarithm |
| r | =radial coordinate of throat=$r_o + t$ |
| $r'$ | =minimum throat radius |
| $r_o$ | =disc radius |
| $s, s_o, s_1$ | =dimensions of manometer |
| t | =radial distance $r - r_o$ |
| $\gamma$ | =unit weight of fluid flowing and in bellows |
| $\gamma_o$ | =unit weight of manometer liquid |
| x | =axial coordinate of throat profile |
| $x'$ | =position of disc in throat |
| $Y_o$ | =value of y for $h=h_o$ |
| z | =discharge setting |

From the foregoing it will be seen that I have provided a flow control valve with a non-linear liquid support embodying the principles and obtaining the features and objectives hereinbefore set forth. The throat of the valve is profiled in accordance with the laws set forth above and the fluid backing support which controls the positioning of the valve is provided by the manometer having the special shaped relationship in accordance with the specific values and laws.

The combination provides a flow control apparatus wherein the flow of a fluid is maintained at a constant rate for varying pressures with the use of improved accurate controlling apparatus.

I claim as my invention:

1. A fluid flow control device comprising a valve housing having an inlet and an outlet, orifice defining means in said housing between said inlet and said outlet directing fluid flow therebetween, valve poppet means cooperatively arranged with said orifice defining means to control fluid flow therebetween, one of said means being movable relative to the other and one of said means having a face profile contoured to vary the flow area between said means when the movable means is given relative movement, the face profile contour following the law $$x = \frac{2Y_o}{\ln H} \left\{ \ln \left[ 2\sqrt{2} \frac{r_o + \frac{t}{2}}{r'^2 - r_o^2} \frac{Y_o}{\ln H} \sqrt{1 - \sqrt{1 - \left(\frac{t \ln H}{Y_o}\right)^2}} \right] - \frac{1}{2} \left[ 1 - \sqrt{1 - \left(\frac{t \ln H}{Y_o}\right)^2} \right] \right\}$$

in which:

$x$ is the axial coordinate of the face profile $Y_o$ is the value of the $y$ coordinate in radial direction for minimum design head loss across the means having the face profile H is the ratio of maximum fluid head to minimum fluid head $r_o$ is the radius of the non-profiled means $t$ is the radial distance $r - r_o$ where $r$ equals the radial coordinate of the face profile $r'$ is the minimum profile radius a fluid expansion chamber reciprocating means exposed to the fluid in said expansion chamber and movable in response to pressure change in the expansion chamber and connected to said movable means to control the size of the flow opening through said orifice, and a liquid chamber adapted to contain liquid and connected to be in communication with said expansion chamber with the weight of the liquid exerting a pressure on the fluid in said expansion chamber, said expansion chamber and liquid chamber providing a non-linear backing for the movable valve means.

2. A fluid flow control device comprising a valve housing having an inlet and an outlet, orifice defining means in said housing between said inlet and said outlet directing fluid flow therebetween, valve poppet means cooperatively arranged with said orifice defining means to control fluid flow therebetween, one of said means being movable relative to the other and one of said means having a face profile contoured to vary the flow area between said means when the movable means is given relative movement, the face profile contour following the law $$C_d A = (C_d A)_{\min} e^{\frac{x' \ln H}{2Y_o}}$$

in which:

$C_d$ is the discharge coefficient

A is the area of opening between the poppet means and orifice $x'$ is the position of the poppet means in the orifice $e$ is the base of natural logarithms H is the ratio of maximum fluid head to minimum fluid head $Y_o$ is the value of the $y$ coordinate for minimum design head loss across disc a fluid expansion chamber, and a liquid manometer chamber adapted to contain liquid and connected to be in communication with said expansion chamber a reciprocating means exposed to the fluid in said expansion chamber and movable in response to fluid pressure change and connected to said movable means to vary the flow area through the orifice means, said expansion chamber and liquid chamber providing a non-linear backing for the movable valve means.

3. In a fluid control device operative to regulate the flow of a fluid, the combination comprising a valve orifice defining means having an orifice through which the path of fluid flow is directed, valve orifice closure means cooperative with said orifice to regulate the effective area for passage of fluid, one of said valve means being movable, a liquid chamber having a curving tapered inner wall surface having a supply container to permit the use and fall of liquid with variations in pressure at the surface and having a varying cross section, positional control means operatively connected between said liquid chamber and one of said means and responsive to the liquid head in said chamber and operative to control the position of said one movable valve means as a function of the head, a fluid conduit connected to the top of said liquid chamber and connected to be exposed to the fluid downstream of the valve in the path of fluid flow whereby the surface of liquid in said chamber is exposed to fluid pressure, and means for controlling the level of liquid in said chamber relative to pressure differential across the valve whereby said movable valve member will be controlled non-linearly according to the shape of the chamber.

4. In a fluid control device operative to regulate the flow of a fluid, the combination comprising a valve orifice defining means having an orifice through which the path of fluid flow is directed, valve orifice closure means cooperative with said orifice to regulate the effective area for passage of fluid, one of said valve means being movable, a liquid chamber having a varying cross section, a fluid pressure conduit connected to be exposed to the liquid at the base of said chamber, a pressure chamber connected to said conduit, a member connected to be movable in response to changes in said pressure chamber and connected to position said movable valve means so that the force of fluid pressure differential is transmitted back to the liquid chamber to vary the liquid head and so that the head exerts a positioning force on said reciprocating valve member.

5. A fluid flow control device comprising a valve housing having an inlet and an outlet, orifice defining means in said housing between said inlet and said outlet directing fluid flow therebetween, a valve poppet means cooperatively arranged within said orifice to control fluid flow therethrough, one of said means being movable relative to the other means, one of said means having a face profile contoured to vary the flow area between said means when said movable means is moved, an expansible fluid chamber connected to said movable means to vary its position and create a non-linear resistance to its movement, a manometer for containing a body of free liquid with the pressure head of liquid transmitted to said fluid chamber, the manometer having a portion of varying cross section and a portion of constant cross section with the variable portion conforming to the relationships $$a = \frac{a_1}{\frac{a_1 \ln H}{A_b Y_o} s_0 e^{\frac{s_1 a_1 \ln H}{A_b Y_o}} - 1}$$

and $$s = s_0 e^{\frac{s_1 a_1 \ln H}{A_b Y_o}} - s_1$$

in which:

$a$ is the cross sectional area of manometer for surface heights of liquid above beginning of variable portion
$s_1$ is the depression of the meniscus in portion of manometer of constant cross section
$a_1$ is the cross sectional area of manometer portion of constant cross section
$s_0$ is the height of the meniscus in variable portion of manometer for a minimum control head
$H$ is the ratio of maximum design head to minimum design head
$Y_o$ is the travel of movable means from minimum design head to maximum design head
$A_b$ is the area of expansible fluid chamber
$e$ is the base of natural logarithms
$s$ is the vertical dimension of the manometer portion of varying cross section.

6. In a fluid flow control device comprising a valve housing having an inlet and an outlet, orifice defining means in said housing between said inlet and outlet admitting a flow of fluid therethrough, valve poppet means cooperatively positioned within said orifice, one of said means having a face profile contoured to vary relative movement between said means, one of said means being movable relative to the other means to vary the flow area through said orifice means, said face profile contoured in accordance with the law $$x = \frac{2Y_o}{\ln H} \ln\left\{ 2\sqrt{2}\,\frac{r_o + \frac{t}{2}}{r'^2 - r_o^2}\,\frac{Y_o}{\ln H}\sqrt{1 - \sqrt{1 - \left(\frac{t \ln H}{Y_o}\right)^2}} - \frac{1}{2}\left[1 - \sqrt{1 - \left(\frac{t \ln H}{Y_o}\right)^2}\right]\right\}$$

in which:

$x$ is the axial coordinate of the face profile
$Y_o$ is the value of the $y$ coordinate for minimum design head loss across the means having the face profile
$H$ is the ratio of maximum fluid head to minimum fluid head
$r_o$ is the radius of the non-profiled means
$t$ is the radial distance $r - r_o$ where $r$ equals the radial coordinate of the face profile
$r'$ is the minimum profile radius, an expansible fluid chamber connected to said movable valve means, a liquid backing manometer chamber having a body of free manometer liquid in communication with said expansion chamber to provide a non-linear liquid resistance to the movement of the movable valve means with fluctuations in fluid pressure, said liquid manometer having a portion of varying cross section and a portion of constant cross section with the variable portion being constructed in accordance with the formulas $$s = s_0 e^{\frac{s_1 a_1 \ln H}{A_b Y_o}} - s_1$$

$$a = \frac{a_1}{\frac{a_1 \ln H}{A_b Y_o} s_0 e^{\frac{s_1 a_1 \ln H}{A_b Y_o}} - 1}$$

in which:

$a$ is the cross sectional area of manometer for surface heights of liquid above beginning of variable portion
$s_1$ is the depression of the meniscus in portion of manometer of constant cross section
$a_1$ is the cross sectional area of manometer portion of constant cross section
$s_0$ is the height of the meniscus in variable portion of manometer for a minimum control head
$H$ is the ratio of maximum design head to minimum design head
$Y_o$ is the travel of movable means from minimum design head to maximum design head
$A_b$ is the area of expansible fluid chamber
$e$ is the base of natural logarithms
$s$ is the vertical dimension of the manometer portion of varying cross section.

7. A fluid flow control device comprising a valve housing having an inlet and an outlet to conduct a flow of fluid therethrough, an orifice defining member in said housing between said inlet and said outlet, a movable valve poppet member positioned relative to said orifice to vary the cross-sectional flow path therethrough with relative movement, an expansible fluid chamber connected to said poppet member to supply a non-linear resistance to vary the position thereof, a liquid chamber having a body of liquid therein unrestrained for variation of height, said liquid chamber having a curved inner wall with a cross section varying with height to apply a varying pressure to said movable member with change in liquid head thereof, a closed supply container furnishing liquid to said liquid chamber beneath the surface of liquid therein to vary the height of liquid in said liquid chamber, and a fluid pressure tube connected to said expansible fluid chamber and to said closed supply container to transmit pressure back to said expansible fluid chamber in accordance with liquid head in said liquid chamber whereby a resistance is applied to said poppet varying as a non-linear function of the height of the liquid in the liquid chamber and the position of the movable poppet member.

8. A fluid flow control device comprising a valve housing having an inlet and an outlet, a fixed orifice in said housing defining flow means between said inlet and outlet, a movable poppet cooperatively arranged in said orifice to control fluid flow, the orifice having a face profile contoured so that the flow area between said orifice and poppet varies inversely as the square root of the head of the fluid flowing therethrough with movement of the poppet, an expansible chamber having a movable wall connected to said poppet to provide a backing force opposing the pressure differential force across said poppet, a tapered resistance liquid chamber containing a body of free liquid, and a fluid conduit connected between said expansible chamber and the base of said liquid chamber so the level of liquid in the chamber will vary with movement of the poppet and a force is exerted on the fluid in the conduit which is a function of the head of the liquid in the chamber, said liquid chamber shaped to provide a varying backing to the poppet and vary the depth of liquid in the chamber with variance in pressure differential across the poppet to position the poppet to maintain a constant rate of flow through the orifice over a range of head pressure change.

9. In a fluid control device operative to regulate a flow of fluid at a substantially uniform rate independent of fluid pressure drop thereacross, the combination comprising a variable valve having a first member defining an opening therethrough and a second member within said opening defining a variable flow path therebetween for passage of fluid, one of said valve members being movable relative to the other to vary the area of flow path opening said member movable with change in pressure drop across the opening, a closed bellows having a fixed end and having a free end connected to said movable member, a liquid chamber for containing a liquid and having a cross-sectional size varying with height and provided with a liquid supply whereby the level of liquid in the chamber may vary, and a fluid conduit connected to said bellows and to said chamber to transmit a pressure signal between said chamber and bellows in accordance with the head of liquid in said chamber, said cross-sectional size of the liquid chamber varying so that the flow area between said valve members will be varied by movement of the movable valve member to obtain constant flow with varying pressure drop across the valve member.

10. A fluid flow control device for regulating a flow of fluid with pressure fluctuation to maintain a constant flow thereof comprising a valve housing having an inlet opening and an outlet opening for conducting fluid flow therethrough, a valve orifice member between said openings defining an orifice through which the fluid flow is directed, a valve poppet member cooperatively arranged within said orifice with one of said valve members movable and adapted for positional control to vary the cross-sectional area of the orifice for constant fluid flow with changes of inlet head, said valve members having facing surfaces which vary the cross-sectional flow area as a predetermined function of movement of the movable member, a liquid chamber containing a body of liquid and with a liquid supply whereby the liquid level may fluctuate, pressure responsive means connected to said movable valve member to impress a resistance in an upstream direction on the movable valve member varying as a function of head in said chamber, and means responsive to the force on said movable valve member caused by the pressure differential across said movable valve member and connected to increase or decrease the amount of liquid in said chamber with increase or decrease of pressure drop across the movable valve member, the liquid chamber shaped relative to said facing surfaces of the valve member so that the movable valve member will be controlled to maintain constant flow.

References Cited in the file of this patent

UNITED STATES PATENTS

| | | |
|---|---|---|
| 1,904,337 | Turner | Apr. 18, 1933 |
| 2,017,311 | Jacobson | Oct. 15, 1935 |
| 2,399,938 | Pett | May 7, 1946 |
| 2,646,060 | Ponsar | July 21, 1953 |

FOREIGN PATENTS

| | | |
|---|---|---|
| 177,393 | Germany | Oct. 27, 1906 |
| 505,839 | Germany | of 1930 |